(12) United States Patent
Speight

(10) Patent No.: US 7,385,994 B2
(45) Date of Patent: Jun. 10, 2008

(54) PACKET DATA QUEUING AND PROCESSING

(75) Inventor: Timothy James Speight, Bristol (GB)

(73) Assignee: IPWireless, Inc., San Bruno, CA (US)

( * ) Notice: Subject to any disclaimer, the term of this patent is extended or adjusted under 35 U.S.C. 154(b) by 1143 days.

(21) Appl. No.: 10/278,342

(22) Filed: Oct. 23, 2002

(65) Prior Publication Data
US 2003/0103497 A1 Jun. 5, 2003

(30) Foreign Application Priority Data
Oct. 24, 2001 (GB) ............................... 0125502.5

(51) Int. Cl.
*H04L 12/28* (2006.01)
(52) U.S. Cl. .................................. 370/412; 370/395.53
(58) Field of Classification Search ................ 370/253, 370/389, 412–429
See application file for complete search history.

(56) References Cited

U.S. PATENT DOCUMENTS

| 6,317,416 | B1 | 11/2001 | Giroux et al. | |
|---|---|---|---|---|
| 6,614,790 | B1* | 9/2003 | Veres et al. | 370/395.2 |
| 6,912,225 | B1* | 6/2005 | Kohzuki et al. | 370/412 |
| 6,977,930 | B1* | 12/2005 | Epps et al. | 370/392 |
| 7,206,282 | B1* | 4/2007 | Goldman et al. | 370/230 |
| 2001/0033581 | A1* | 10/2001 | Kawarai et al. | 370/468 |
| 2002/0163922 | A1* | 11/2002 | Dooley et al. | 370/412 |
| 2002/0172156 | A1* | 11/2002 | Sandbote | 370/230 |

FOREIGN PATENT DOCUMENTS

| DE | 19907085 | 4/2000 |
|---|---|---|
| EP | 1124356 | 8/2001 |
| GB | 2338372 | 12/1999 |
| GB | 2341751 | 3/2000 |
| GB | 2361147 | 10/2001 |
| WO | WO-0174027 | 10/2001 |

OTHER PUBLICATIONS

Chaskar et al. (2003). "Fair Scheduling with Tunable Latency: A Round-Robin Approach," IEEE/ACM Transactions on Networking, 11(4)592-601, 6 pages.
International Search Report mailed Apr. 29, 2003 for PCT Application No. PCT/GB02/04823 filed Oct. 24, 2002, 3 pages.

(Continued)

*Primary Examiner*—Chi Pham
*Assistant Examiner*—Phuc Tran
(74) *Attorney, Agent, or Firm*—Morrison & Foerster LLP

(57) ABSTRACT

A method of processing queued data packets in a packet data communication system is provided. The method includes allocating a tier of service for substantially each of a plurality of individual packet data queues and determining a total number of data packets that can use an available communication resource. A proportion of a total number of data packets is allocated to a number of the tiers of service to allow individual packet data queues on a number of tiers to share a communication resource. A communication resource is provided to queued packet data users on a tier-by-tier basis, such that the communication resource is made available to substantially all tiers.

25 Claims, 3 Drawing Sheets

OTHER PUBLICATIONS

Keshav, S. "Stop-and-Go Service Using Hierarchical Round Robin." Downloaded on Jul. 31, 2007, from <http://cm.bell-labs.com/cm/cs/doc/91/2-15.ps.gz>, 10 pages.

"Understanding Weighted Fair Queuing on ATM." Downloaded on Jul. 31, 2007, from <http://www.cisco.com/warp/public/121/wfq_illustrated.pdf>, 10 pages.

Zhang et al. (1993). "Rate Controlled Static-Priority Queueing," In Proceedings of IEEE IFOCOM '93. Downloaded on Jul. 31, 2007, from <http://www.cs.cmu.edu/~hzhang/papers/INFOCOM93.pdf>, 11 pages.

Bennett et al. (Oct. 1997). "Hierarchical packet fair queueing algorithms," IEE/ACM Transactions on Networking (TON), 5(5):675-689.

Semeria, C. (2001). "Supporting Differentiated Service Classes: Queue Scheduling Disciplines," Juniper Network, Inc. Downloaded on Jul. 31, 2007, from <http://www.juniper.net/solutions/literature/white_papers/200020.pdf x, pp. 1-25.

Search Report dated May 10, 2002, for GB Application No. GB 0125502.5, one page.

Held, G. (1997). *Understanding Data Communications: From Fundamentals to Networking.* John Wiley & Sons Ltd: West Sussex, England, 16 pages (Table of Contents).

Zhang, H. (Oct. 1995). "Service Disciplines for Guaranteed Performance Service in Packet-Switching Networks," *Proceedings of the IEEE* 83(10):1374-1396.

\* cited by examiner

PACKET DATA QUEUING AND PROCESSING

FIELD OF THE INVENTION

This invention relates to gateway queuing algorithms in packet networks. The invention is applicable to, but not limited to, gateway queuing algorithms in packet data transmissions, for example for use in the universal mobile telecommunication standard.

BACKGROUND OF THE INVENTION

An established cellular radio communication system is GSM (Global System for Mobile Communications). A further wireless communication system currently being defined is the universal mobile telecommunication system (UMTS), which is intended to provide a harmonised standard under which cellular radio communication networks and systems will provide enhanced levels of interfacing and compatibility with other types of communication systems and networks.

A fixed network interconnects wireless communication serving elements, such as Node Bs. This fixed network comprises communication lines, switches, interfaces to other communication networks and various controllers required for operating the network. Hence, a call from a UE is generally routed through the fixed network to the destination unit specific to this call. If the call is between two UEs of the same communication system the call will be routed through the fixed network to the Node B of the cell in which the other mobile station currently is. A connection is thus established between the two serving cells through the fixed network.

Wireless communication systems are distinguished over fixed communication systems, such as the public switched telephone network (PSTN), principally in that UEs move between coverage areas served by different Node B (and/or different service providers). In general, wireless subscriber units are typically provided with the ability to communicate to fixed networks such as the PSTN. If a UE wishes to call a telephone connected to the Public Switched Telephone Network (PSTN) the call is routed from the serving Node B to the interface between the cellular mobile communication system and the PSTN. It is then routed from the interface to the telephone by the PSTN.

Traditional traffic in wireless mobile cellular communication systems, such as GSM, has been circuit-switched voice data. In circuit-switched data systems, a permanent link is set up between the communicating parties, for the entire duration of the communication. Even during idle times, no other potential users may use the resources of the allocated communication path.

In addition to speech and data services, it is envisaged that, in future wireless communication systems, there will be an increasing need to support high-speed multimedia communications. A significant requirement of future wireless communication systems is their ability to provide users with improved opportunities to interact with information networks such as the Internet. It is also envisaged that the typical requirements for a subscriber communication terminal will be to transmit data at irregular intervals, in contrast to the continuous manner provided by current circuit-switched wireless communication systems. Clearly, with irregular transmissions it is inefficient to have a continuous link set up between users.

Consequently, it is envisaged that wireless communication systems will increasingly use packet-switched data technology, to interface to public data networks or information networks such as the Internet. In packet-switched data networks, information or messages are divided into standard length data packets for transmission. Each data packet is transmitted independently through the infrastructure from a source node to a destination node. This may mean that the data packets arrive out of order due to the fact that separate communication paths are established for individual data packets for the duration of the particular data packet transmission.

A cellular communication network generally interfaces with a packet-switched network, such as the Internet, via an Internet router serving as a gateway to the cellular communications network. Thus, when information is to be communicated to or from a MS or UE in a cellular communications network or system, the route is established to the appropriate Internet router, serving as the gateway of the cellular communication network. An example of a packet-based wireless communication system is the General Packet Radio Service (GPRS) developed to supplement the GSM communication system for high-speed data communication. Further details on packet data systems can be found in "Understanding data communications: from fundamentals to networking", $2^{nd}$ ed., John Wiley publishers, author Gilbert Held, 1997, ISBN 0-471-96820-X.

In a packet data based system, where a high number of subscriber units may require resources for packet transmissions at unknown and irregular intervals, it is important to optimise use of the limited communication resource. Hence, a means of scheduling and ordering of the time of transmission of the individual packets is needed. This becomes even more important when individual data packets have different requirements with respect to delay, bit error rate etc.

Therefore, most packet based systems contain schedulers which control when the individual data packets are transmitted in order to share the available resource, whether time-slots in a TDMA system or power and codes in a CDMA system. An introduction to schedulers can be found in "Service discipline for guaranteed performance service in packet-switching networks", Hui Zhang, Proceedings of the IEEE, volume 83, no. 10, October 1995.

However, known schedulers have been optimised for environments other than CDMA communication systems. For example, scheduling algorithms used for GPRS are optimised for a Time Division Multiple Access (TDMA) system and therefore not optimal for CDMA-based systems such as UMTS where codes and power must be shared.

FIG. 1 illustrates a known arrangement 100 for providing a number of clients ($C_1 \ldots C_N$) 110 with access to packet data based services. The individual clients 112, 114, 116 have data packets to be transferred through a network and are competing for a time-shared resource (S) 130 such as a communication channel or CPU time. A gateway 120 is positioned between the clients and the shared resource, to co-ordinate the transferral of the data packets onto the resource. Hence, a number of data packets are "queued" until the gateway transfers the data packet to the time-shared resource (S) 130. The gateway 120 includes a gateway queue algorithm (GW) that determines how the resource is to be shared between queued data packets from the respective clients.

Two well know queue service algorithms, to allocate the communication resource between queued data packets, are:
(i) Weighted fair queuing; and
(ii) Hierarchical round robin.

WEIGHTED FAIR QUEUING

Weighted fair queuing is a packet queuing/ordering scheme based on a bit-by-bit round-robin allocation. The gateway 120 maintains separate queues for packets from each user 112, 114, 116. The gateway 120 processes the queues in a bit-by-bit round-robin manner by knowing the throughput of the time-shared resource/server 130. Under these conditions it is clear that if there are N users then the throughput provided to each user will be 1/N.

It is possible to extend the scheme by defining parameters $\phi_1 \ldots \phi_N$ (weights) that set the number of bits allocated to each user per round. This extension allows differential service rates to be provided to different users.

Weighted fair queuing (also known as generalised processor sharing) further extends the bit-by-bit round-robin technique so that it can be used in packet-based systems with packets of differing size. If we assume that $F_P$ is the hypothetical time a data packet would depart the queuing gateway when bit-by-bit round-robin servicing is employed, the weighted fair queuing algorithm would process data packets in increasing order of $F_P$.

A weighted fair queuing system is therefore characterised in the following manner. Let $S_i(t_0, t)$ be the amount of traffic served from user i in the interval $(t_0, t)$, such that:

$$\frac{S_i(t_0, t)}{S_j(t_0, t)} \geq \frac{\phi_i}{\phi_j} \quad [1]$$

Where $j=1,2, \ldots N$

Therefore, it can be seen that the features of fair weighted queuing are:
(i) It provides a fair allocation of bandwidth;
(ii) It is resistant to ill-behaved packet data sources; and
(iii) It offers the potential to provide a lower delay for sources not using their full share of the available communication bandwidth.

HIERARCHICAL ROUND-ROBIN

A hierarchical round-robin scheme employs multiple levels or tiers. Within each tier a round-robin service is provided to users using a fixed number of slots. A user is allocated a fixed number of slots in each tier. The time taken to service all the slots within a level (or tier) is termed the frame time. Clearly the shorter the frame time the greater the proportion of the bandwidth allocated to this level. Thus, differential service can be provided to users on a level or tier basis.

However, the hierarchical round robin system does not provide fair allocation of bandwidth to users because resources cannot be transferred between tiers. Furthermore, where differential service is to be provided on a tier-wise basis, the provision of many queues is undesirable. The inventor of the present invention has recognised that the increased number of queues is a function of the lower tiers being serviced only once all of the higher tier queues have been processed. This is particularly the case when the number of allocated resource units per round is small compared to the total number of clients requiring service.

Furthermore, when data packets are all of the same length, a round-robin allocation of packets maintains the fair allocation of resources that fair weighted queuing offers. Therefore, the maintenance of a notional bit-by-bit round-robin allocator is redundant and thereby inefficient in the speedy processing of queued packets.

Also in a system where different users experience very different throughputs (e.g. when they experience different radio conditions) a weighted fair queuing system faces problems in fair allocation to users since the bit-by-bit round robin simplification does not hold.

The approach of combining hierarchical round robin and weighted fair queuing has not be considered in the past due to the difficulty of determining the number of packets which should be allocated to each tier when there are a variable number of users in each tier.

Thus, there exists a need in the field of the present invention to provide an improved packet data queuing method, algorithm and associated elements wherein the abovementioned disadvantages may be substantially alleviated.

STATEMENT OF INVENTION

In accordance with a first aspect of the present invention, there is provided a method of processing queued data packets in a packet data communication system, the method, comprising the step of:
  allocating a tier of service for substantially each of a plurality of individual packet data queues;
  wherein the method is characterised by the steps of:
    determining a total number of data packets that can use an available communication resource;
    allocating a proportion of said total number of data packets to a number of the tiers of service to allow individual packet data queues on a number of tiers to share a communication resource; and
    providing said communication resource to queued packet data users on a tier-by-tier basis, such that said communication resource is made available to a substantial number of tiers.

In accordance with a second aspect of the present invention, there is provided a packet data scheduler queuing data packets in a packet data communication system, the packet data scheduler comprising:
  means for allocating a tier of service for substantially each of a plurality of individual packet data queues;
  means for determining a total number of data packets that can use an available communication resource;
  means, operably coupled to the aforementioned means, for allocating a proportion of said total number of data packets to a number of the tiers of service to allow individual packet data queues on a number of tiers to share a communication resource;
  wherein the packet data scheduler is characterised by:
    scheduling means to provide said communication resource to queued packet data users on a tier-by-tier basis, such that said resource is made available to substantially all tiers.

In accordance with a third aspect of the present invention, a communication unit comprises the packet data scheduler of the second aspect.

In accordance with a fourth aspect of the present invention, packet data communication system comprises the packet data scheduler of the second aspect or is adapted to facilitate the method of the first aspect.

In accordance with a fifth aspect of the present invention, there is provided a storage medium storing processor-implementable instructions to carry out the method of the first aspect.

In summary, an apparatus and method are described to provide for a tier-based weighted fair queuing scheme. The preferred algorithm operates using rate allocating service disciplines rather than rate controlled service disciplines. That is to say the algorithm is configured to combine advantageous features of known techniques, without incurring their associated problems, in order to service packets at a faster rate than the prior art hierarchical round-robin or weighted fair queuing schemes.

Figure 1:
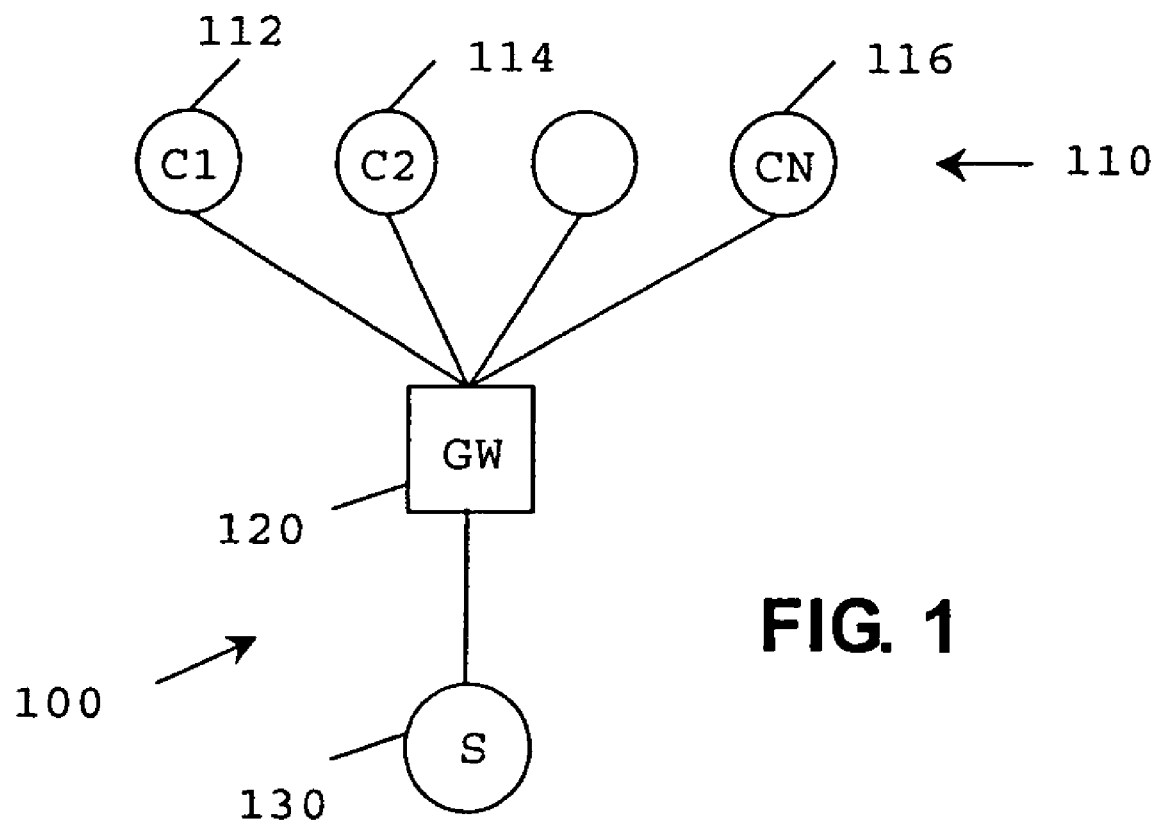
FIG. 1 illustrates a simple known packet data queuing arrangement.
Figure 2:
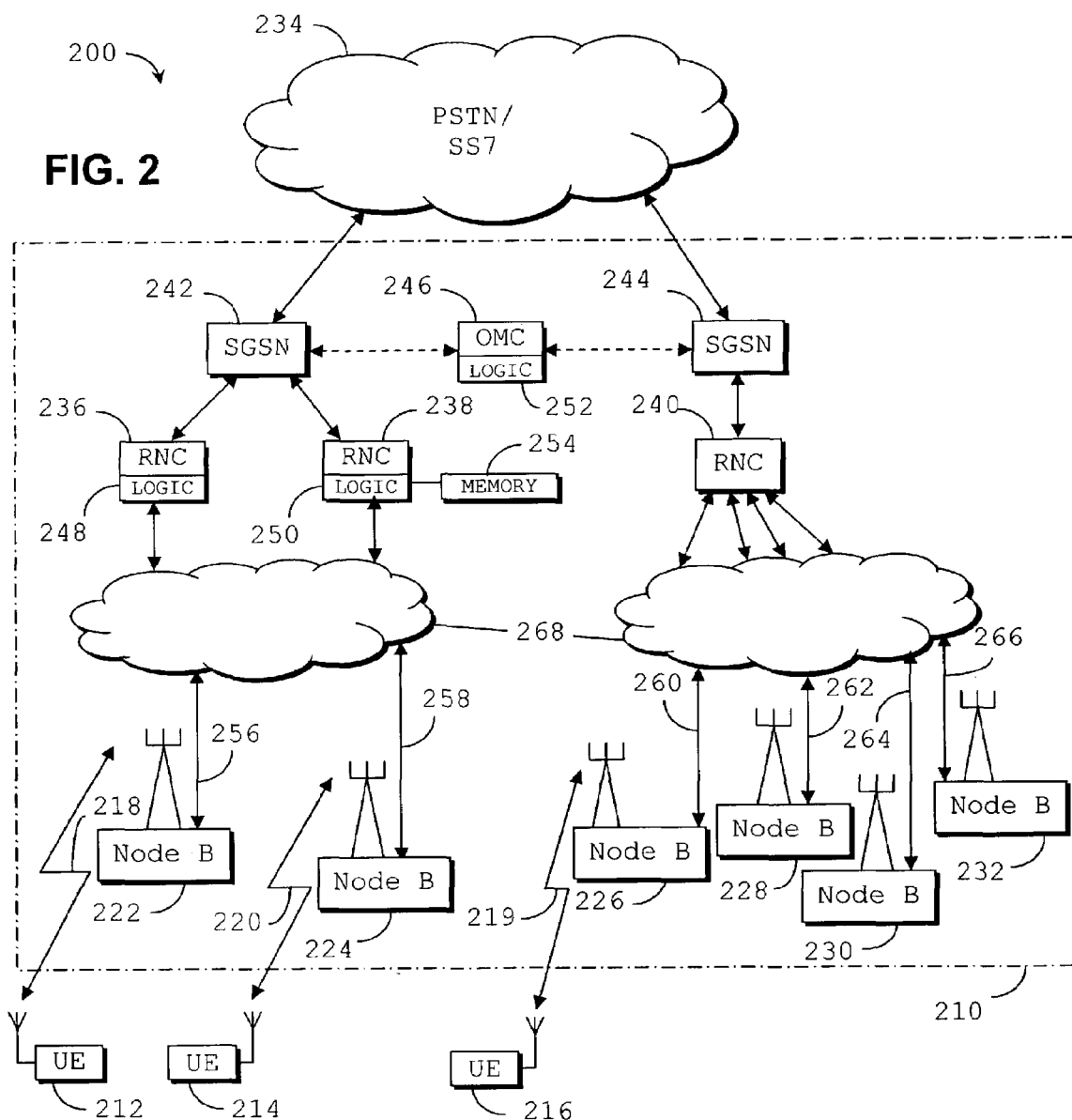
Figure 3:
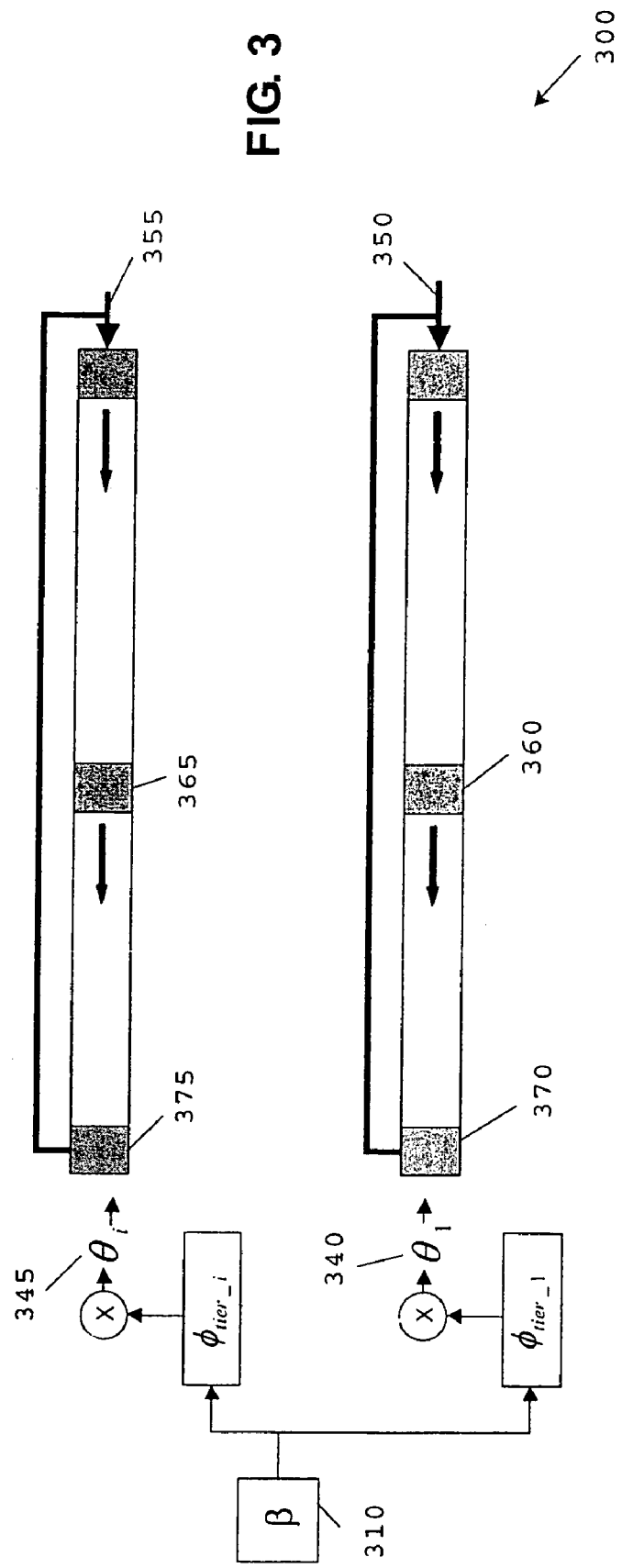

Exemplary embodiments of the present invention will now be described, with reference to the accompanying drawings, in which:

FIG. 2 shows a block diagram of a wireless communication system, adapted in accordance with various inventive concepts of a preferred embodiment of the present invention; and FIG. 3 shows a flowchart/functional block diagram of a packet data processing operation incorporating the present invention.

DESCRIPTION OF PREFERRED EMBODIMENTS

Referring now to FIG. 2, a cellular-based telephone communication system 200 is shown in outline, in accordance with a preferred embodiment of the invention. In the preferred embodiment of the invention, the cellular-based telephone communication system 200 is compliant with, and contains network elements capable of operating over, a UMTS air-interface. In particular, the invention relates to the Third Generation Partnership Project (3GPP) specification for wideband code-division multiple access (WCDMA) standard relating to the UTRAN radio Interface (described in the European Telecommunication Standards Institute's (ETSI's)3G TS 25.xxx series of specifications).

A plurality of subscriber terminals (or user equipment (UE) in UMTS nomenclature) 212, 214, 216 communicate over radio links 218, 219, 220 with a plurality of base transceiver stations, referred to under UMTS terminology as Node-Bs, 222, 224, 226, 228, 230, 232. The system comprises many other UEs and Node Bs, which for clarity purposes are not shown.

The wireless communication system, sometimes referred to as a Network Operator's Network Domain, is connected to an external packet-based network 234, for example the Internet. The Network Operator's Network Domain (described with reference to both a 3$^{rd}$ generation UMTS and a 2$^{nd}$ generation GSM system) includes:

(i) A core network, namely at least one Gateway GPRS Support Node (GGSN) 244 and or at least one Serving GPRS Support Nodes (SGSN); and (ii) An access network, namely:
  (ai) a GPRS (or UMTS) Radio network controller (RNC) 236-240; or
  (aii) Base Site Controller (BSC) in a GSM system and/or
  (bi) a GPRS (or UMTS) Node B 222-232; or
  (bii) a Base Transceiver Station (BTS) in a GSM system.

The GGSN/SGSN 244 is responsible for GPRS (or UMTS) interfacing with a Public Switched Data Network (PSDN) such as the Internet 234 or a Public Switched Telephone Network (PSTN) 234. A SGSN 244 performs a routing and tunnelling function for traffic within say, a GPRS core network, whilst a GGSN 244 links to external packet networks, in this case ones accessing the GPRS mode of the system.

The Node-Bs 222-232 are connected to external networks, through base station controllers, referred to under UMTS terminology as Radio Network Controller stations (RNC), including the RNCs 236, 238, 240 and mobile switching centres (MSCs), such as MSC 242 (the others are, for clarity purposes, not shown) and SGSN 244 (the others are, for clarity purposes, not shown).

Each Node-B 222-232 contains one or more transceiver units and communicates with the rest of the cell-based system infrastructure via an $I_{ub}$ interface, as defined in the UMTS specification.

Each RNC 236-240 may control one or more Node-Bs 222-232 and includes both processing elements 248 and logical elements 250. Each MSC 242 provides a gateway to the external network 234. The Operations and Management Centre (OMC) 246 is operably connected to RNCs 236-240 and Node-Bs 222-232 (shown only with respect to Node-B 226 for clarity). The OMC 246 administers and manages sections of the cellular telephone communication system 200, as is understood by those skilled in the art.

In the preferred embodiment of the invention, one or more processing elements 248 contained with one or more RNCs 236-240 have been adapted, to facilitate packet data queuing and scheduling in accordance with the preferred embodiment of the present invention. In particular, the preferred embodiment of the present invention describes an algorithm implemented in one or more RNCs to schedule queued packet data transmissions using rate allocating service disciplines rather than rate controlled service disciplines.

In a rate allocating service discipline if excess bandwidth is available then it is possible to allocate more packets to certain users as long as the service guarantees provided to the other users are not broken. In contrast, in a rate controlled service discipline, irrespective of the bandwidth that is available, the packets are only allocated at the guaranteed rate.

In the preferred embodiment of the invention, we assume that allocation of resources by the RNC 236 can only be made at certain time interval or rounds (also possibly referred to as frames), as occurs in known packet data systems. Hence, for example, users compete for a 10 Mbps link, the users transmit data packets of length 1 kbit and that the round period is 10 msec. Therefore, in each round 100 packets are allocated. For simplicity, it is also assumed that packets are always of fixed size.

It should be noted that the inventive concepts could still be applied when non-fixed length packets are employed. However, under these conditions the scheme will not guarantee a fair allocation of bandwidth. It is envisaged that in some packet data systems, this may be acceptable. Nevertheless, in the preferred context of a wireless communication system the packet (resource unit) allocations are likely to be the same size (and small).

The packet data queuing algorithm in the RNC processor 248 is based around the concept of employing different tiers of service. In particular, each tier, of a number of tiers of service, is configured to provide users with a commitment that a proportion of the entire system bandwidth will be allocated to users operating on that particular tier. As a simple example, if we assume two-tiers of service with a single user in each tier, we might allocate 75% of the entire system resource to the user of the higher tier and 25% of the entire resource to the user of the lower tier.

It is within the contemplation of the invention that any number of tiers can be used in employing the inventive concepts herein described.

Furthermore, in the preferred embodiment of the invention, in order to control the relative proportions of system bandwidth allocated to each tier, different weights are allocated for each tier. Hence, the i$^{th}$ tier may be defined with a tier weight $S_{tier\_i}$.

In this manner, a tier-based weighted fair queuing scheme has been implemented. Although the invention is described with regard to a 3GPP wireless communication system, it is envisaged that for other wired or wireless communication systems facilitating packet data transmissions, algorithms other than the preferred one described below with respect to FIG. 3 could be implemented, that use a tier-based weighted fair queuing algorithm. Furthermore, other criteria and/or equation(s) could be employed in determining an appropriate queuing scheme using the hereinafter described inventive concepts.

It is also within the contemplation of the invention that any elements managing packet data transmission, queuing, scheduling and/or routing may be controlled, implemented in full or implemented in part by adapting any other suitable part of the communication system 200. For example, packet data queuing may be implemented in one or more MSC 242, or within a cell using an adapted Node B 222. Alternatively, equivalent elements in other types of systems may, in appropriate circumstances, be adapted to provide or facilitate the tier-based weighted fair queuing as described herein.

Referring now to FIG. 3, a flowchart/functional block diagram of a packet data processing scheme 300 incorporating the present invention is illustrated. The preferred scheme operates over a number of tiers, greater than one, with two tiers shown for clarity purposes only. The tier of service for each user is determined when the session for each user begins. For the remaining part of this description, it has been assumed that this procedure has already been completed.

Preferably, each user is provided with an identification (ID) code, which provides an identifier for the user and an indication of the amount of the data the user wishes to transfer. When a user is entered onto the packet data scheme, the user's ID is placed at the tail of the appropriate queue, depending on the tier of service, for example tail 355 of the $i^{th}$ tier, or tail 350 of the lowest tier. Note that the user data is stored separately.

In the $i^{th}$ tier, let us assume that $N_{tier\_i}$ users are determined as wishing to transmit data packets. Thus, the proportion of the entire system resource, allocated to the $1^{st}$ tier, (within a system employing a total of L tiers), can be defined by the following function 325:

$$\phi_{tier\_i} = \frac{N_{tier\_i} * S_{tier\_i}}{\sum_{k=1}^{L} N_{tier\_k} * S_{tier\_k}} \quad [2]$$

The total number of data packets that can be allocated in a single round, β310, can then be determined. Assuming that there are L tiers we define the number of packets allocated to each tier; $\theta_1 \ldots \theta_L$. Thus, $\theta_i$ packets 345 can be allocated to the $i^{th}$ tier, where:

$$\theta_i = \phi_{tier\_i} * \beta \quad [3]$$

Within each tier, packets are then allocated in a round-robin fashion in the following manner. γ packets are allocated to the user whose ID is at the head 375 of the tier queue. γ is selected offline as a value that defines the number of packets that can be allocated to a user when at the head of the tier queue. Alternatively, it can be determined from an algorithm that attempts to counteract the fact that user throughputs vary dependent on radio-channel conditions.

When these γ packets have been allocated the user ID at the head of the tier queue 375 is sent to the tail of the queue 355, and the queue moved along. Hence, the users move from the tail of the queue at location 355, through an intermediate location at 365 to the head of the queue at location 375, and then back to the tail of the queue at location 355. This process is repeated until a total of θ packets 345 have been allocated in this tier.

This is repeated for all tiers, in the pre-allocated proportions for each tier. Within each lower tier, packets are also allocated in a round-robin fashion. When the tier level reaches the lowest tier of users, the resource is again allocated to the user, who's ID is at the head 370 of the lowest tiered queue. When the available communication resource has been allocated the user ID at the head of the lowest tiered queue 370, the user ID is sent to the tail of the queue 350, and the queue moved along. Hence, the lowest priority users move from the tail of the queue at location 350, through an intermediate location at 360 to the head of the queue at location 370, and then back to the tail of the queue at location 350. This process is repeated until a total of $\theta_1$ packets 340 have been allocated in the lowest tier.

In this manner, the number of queues is kept to a minimum and the available communication resource more effectively shared amongst all users, dependent upon their allocated tier and, to some extent, irrespective of their (tail) starting position in the queue within the tier.

It is envisaged that the various packet data queuing/ordering components within the RNC 236-240 are realised in this embodiment in integrated component form. Of course, in other embodiments, they may be realized in discrete form, or a mixture of integrated components and discrete components, or indeed any other suitable form.

Furthermore, in this embodiment the queuing algorithm function is implemented preferably in a digital signal processor. However, it is within the contemplation of the invention that the queuing algorithm function described in the above embodiments can be embodied in any suitable form of software, firmware or hardware. The queuing algorithm function may be controlled by processor-implementable instructions and/or data, for carrying out the methods and processes described, which are stored in a storage medium or memory. The processor-implementable instructions and/or data may include any of the following:
  (i) The algorithm for determining the tier-based queuing scheme, or
  (ii) A new or adapted lookup table containing revised queuing parameters or weights.
  (iii) New values of $S_{tier\_i}$ for allocating respective proportions of the available communication resource to an individual tier.

It is envisaged that the memory containing the above programs can be a circuit component or module, e.g. a random access memory (RAM) or programmable read only memory (PROM), or a removable storage medium such as a disk, or other suitable medium.

It will be understood that the tier based weighted fair queuing algorithm, described above, provides at least the following advantages over the weighted fair queuing scheme:
  (i) It is considerably easier to implement.
  (ii) It allows better control of resources when throughput rates vary on a per user basis but the packet size remains fixed.
  (iii) It is more applicable when the when the number of allocated resource units per round is small compared to the total number of clients requiring service.

It will also be understood that the tier based weighted fair queuing algorithm, described above, provides at least the following advantages over the hierarchical round robin scheme:
  (i) The algorithm is processor efficient, i.e. the system is not idle when there is a data packet to send.
  (ii) The algorithm is more flexible to changes in the overall number of users served changes (each tier is provided with a constant share of the overall bandwidth irrespective of the number of users in that tier).

Thus, an improved packet data queuing algorithm and associated elements have been described wherein the aforementioned disadvantages associated with prior art arrangements has been substantially alleviated.

Whilst specific, and preferred, implementations of the present invention are described above, it is clear that one skilled in the art could readily apply variations and modifications of such inventive concepts.

The invention claimed is:

1. A method of processing queued data packets in a packet data communication system, the method comprising:
    allocating a tier of service for each of a plurality of individual packet data queues, wherein allocating a tier of service comprises:
    determining a total number of data packets that can use an available communication resource;
    allocating different weights to each tier of service based on a number of users requiring access to the available communication resource;
    allocating a proportion of said total number of data packets to a number of the tiers of service to allow individual packet data queues on a number of tiers to share a communication resource; and
    providing said communication resource to queued packet data users on a tier-by-tier basis, such that said communication resource is made available to a number of tiers.

2. The method of processing queued data packets in a packet data communication system according to claim 1, wherein said allocating a proportion of a total number of data packets further comprises:
    providing a commitment that a proportion of an entire communication system bandwidth is allocated to users operating on a particular tier.

3. The method of processing queued data packets in a packet data communication system according to claim 1, the method further comprising:
    allocating different weights to each tier of service to provide a differential level of service in the allocation of said communication resource between said tiers.

4. The method of processing queued data packets in a packet data communication system according to claim 1, wherein said allocating a proportion of a total number of data packets is performed by using rate allocating service disciplines.

5. The method of processing queued data packets in a packet data communication system according to claim 1, the method further comprising:
    providing a packet data user with an identification code to assist in the tier allocation, wherein, the identification code provides at least one of the group consisting of: an identifier for the user and an indication of a number of data packets that the user wishes to transfer.

6. The method of processing queued data packets in a packet data communication system according to claim 5, the method further comprising:
    determining, for each respective tier, that a number of data packets are requested to be processed; and
    allocating a proportion of said communication resource to each tier in response to said determination.

7. The method of processing queued data packets in a packet data communication system according to claim 1, the method further comprising:
    placing a user at a tail of an allocated queue, depending on the userts tier of service when said user provides data packets for queuing.

8. The method of processing queued data packets in a packet data communication system according to claim 1, the method further comprising:
    allocating data packets to a user at a head of the tier queue;
    moving said user at said head of the tier queue to the tail of the queue when the user's data packets have been sent; and
    moving other users in the queue closer to the head of the queue.

9. The method of processing queued data packets in a packet data communication system according to claim 8, the method further comprising:
    repeating the method of claim 8 until the total number of packets allocated to the tier is transferred.

10. The method of processing queued data packets in a packet data communication system according to claim 1, the method further comprising:
    determining a tier of service for each user when a packet data session for each user commences.

11. A packet data scheduler queuing data packets in a packet data communication system, the packet data scheduler comprising:
    means for allocating a tier of service for each of a plurality of individual packet data queues, wherein the means for allocating allocates different weights to each tier of service based on a number of users requiring access to the available communication resource;
    means for determining a total number of data packets that can use an available communication resource;
    means, operably coupled to the aforementioned means, for allocating a proportion of said total number of data packets to a number of the tiers of service to allow individual packet data queues on a number of tiers to share a communication resource; and
    scheduling means to provide said communication resource to queued packet data users on a tier-by-tier basis, such that said resource is made available to all tiers.

12. The packet data scheduler according to claim 11, wherein said means for allocating a proportion of a total number of data packets provides a commitment that a proportion of an entire communication system bandwidth is allocated to users operating on a particular tier.

13. The packet data scheduler according to claim 11, wherein said means for allocating different weights to each tier of service is operable for providing a differential level of service in the allocation of said communication resource between said tiers.

14. The packet data scheduler according to claim 11, wherein said means for allocating a proportion of a total number of data packets allocates data packets using rate allocating service disciplines.

15. The packet data scheduler according to claim 11, wherein said means for allocating a proportion of a total number of data packets provides a packet data user with an identification code to assist in the tier allocation step, wherein the identification code provides at least one of the group consisting of: an identifier for the user and an indication of a number of data packets that the user wishes to transfer.

16. The packet data scheduler according to claim 15, wherein saidmeans for allocating a proportion of a total number of data packets determines, for each respective tier, that a number of data packets are requested to be processed; and allocates a proportion of said communication resource to each tier in response to said determination.

17. The packet data scheduler according to claim 11, wherein said scheduling means is operable for placing a user at a tail of the allocated queue, depending on the user's tier of service in response to the user providing data packets for queuing.

18. The packet data scheduler according to claim 11, wherein said scheduling means is operable for:
allocating data packets to a user at a head of the tier queue;
moving said user at said head of the tier queue to the tail of the queue when the user's data packets have been sent; and
moving other user's in the queue closer to the head of the queue.

19. The packet data scheduler according to claim 18, wherein said scheduling means repeats the operation of moving data packets and allocating data packets to a head of a tier queue until the total number of packets allocated to the tier has been transferred.

20. A communication unit comprising the packet data scheduler of claim 11.

21. The communication unit according to claim 20, wherein said communication unit operates as a gateway to and/or from two packet data networks.

22. The communication unit of claim 20, wherein said communication unit is a radio network controller for operation in a third Generation Partnership Project (3GPP) specification for wide-band code-division multiple access (WCDMA) communication system.

23. A packet data communication system comprising the packet data scheduler of claim 11.

24. A packet data communication system operable for processing queued data packets, the system comprising:
a packet data scheduler, the packet data scheduler comprising:
logic for allocating a tier of service for each of a plurality of individual packet data queues, wherein the means for allocating allocates different weights to each tier of service based on a number of users requiring access to the available communication resource;
logic for determining a total number of data packets that can use an available communication resource;
logic, operably coupled to the aforementioned means, for allocating a proportion of said total number of data packets to a number of the tiers of service to allow individual packet data queues on a number of tiers to share a communication resources; and
scheduling logic for providing said communication resource to queued packet data users on a tier-by-tier, such that said resource is made available to all tiers.

25. A computer-readable medium comprising computer executable instructions for performing the method of claim 1.

* * * * *